United States Patent
Carlough et al.

(10) Patent No.: US 10,303,440 B2
(45) Date of Patent: May 28, 2019

(54) COMBINED RESIDUE CIRCUIT PROTECTING BINARY AND DECIMAL DATA

(71) Applicant: INTERNATIONAL BUSINESS MACHINES CORPORATION, Armonk, NY (US)

(72) Inventors: Steven R. Carlough, Poughkeepsie, NY (US); Klaus M. Kroener, Ehningen (DE); Silvia Melitta Mueller, Altdorf (DE); Andreas Wagner, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 15/409,778

(22) Filed: Jan. 19, 2017

(65) Prior Publication Data

US 2018/0203672 A1    Jul. 19, 2018

(51) Int. Cl.
  *G06F 7/48* (2006.01)
  *G06F 7/72* (2006.01)

(52) U.S. Cl.
  CPC ............... *G06F 7/729* (2013.01); *G06F 7/48* (2013.01)

(58) Field of Classification Search
  CPC ............ G06F 7/72; G06F 7/727; G06F 7/729
  See application file for complete search history.

(56) References Cited

U.S. PATENT DOCUMENTS

| 4,924,467 A * | 5/1990 | Criswell | G06F 11/104 700/10 |
|---|---|---|---|
| 4,926,374 A | 5/1990 | Schaffer | |
| 7,739,323 B2 | 6/2010 | Lipetz et al. | |
| 8,984,039 B2 * | 3/2015 | Boersma | G06F 7/38 708/491 |
| 9,513,870 B2 * | 12/2016 | Jacob | G06F 7/727 |
| 2010/0036901 A1 | 2/2010 | Rarick | |
| 2010/0146027 A1 * | 6/2010 | Dao | G06F 11/08 708/491 |

OTHER PUBLICATIONS

D. Llpetz, et al, Self Checking in Current Floating-point Units, 2011 20th IEEE Symposium on Computer Arithmetic, IEEE Computer Society, 2011, p. 73-76 (Year: 2011).*

(Continued)

*Primary Examiner* — Andrew Caldwell
*Assistant Examiner* — Emily E Larocque
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A combined residue circuit configured to receive data and to provide a first residue result and a second residue result. The first residue result is based on a first modulo value, and the second residue result is based on a second modulo value. The first modulo value is different than the second modulo value. The first residue result is to be used to protect data based on a first radix, and the second residue result is to be used to protect data based on a second radix different from the first radix.

20 Claims, 8 Drawing Sheets

(56) References Cited

OTHER PUBLICATIONS

S. Carlough, et al, The IBM zEnterprise-196 Decimal Floating-Point Accelerator, 2011 20th IEEE Symposium on Computer Arithmetic, IEEE Computer Society, 2011, p. 139-146 (Year: 2011).*

C. Dhivya, et al., Design of 8×8 Wallace Multiplier Using Mux Based Full Adder with Compressor, International Research Journal of Engineering and Technology, vol. 02 Issue 08, Nov. 2015, p. 796-803 (Year: 2015).*

Mel, Peter and Tim Grance, "The NIST Definition of Cloud Computing," National Institute of Standards and Technology, Information Technology Laboratory, Special Publication 800-145, Sep. 2011, pp. 1-7.

* cited by examiner

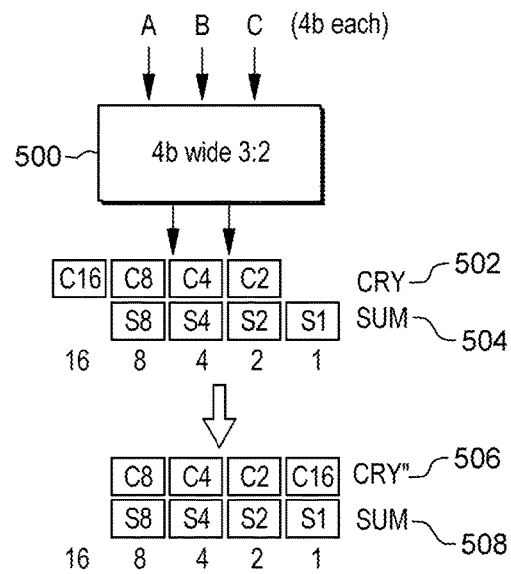
FIG. 5A
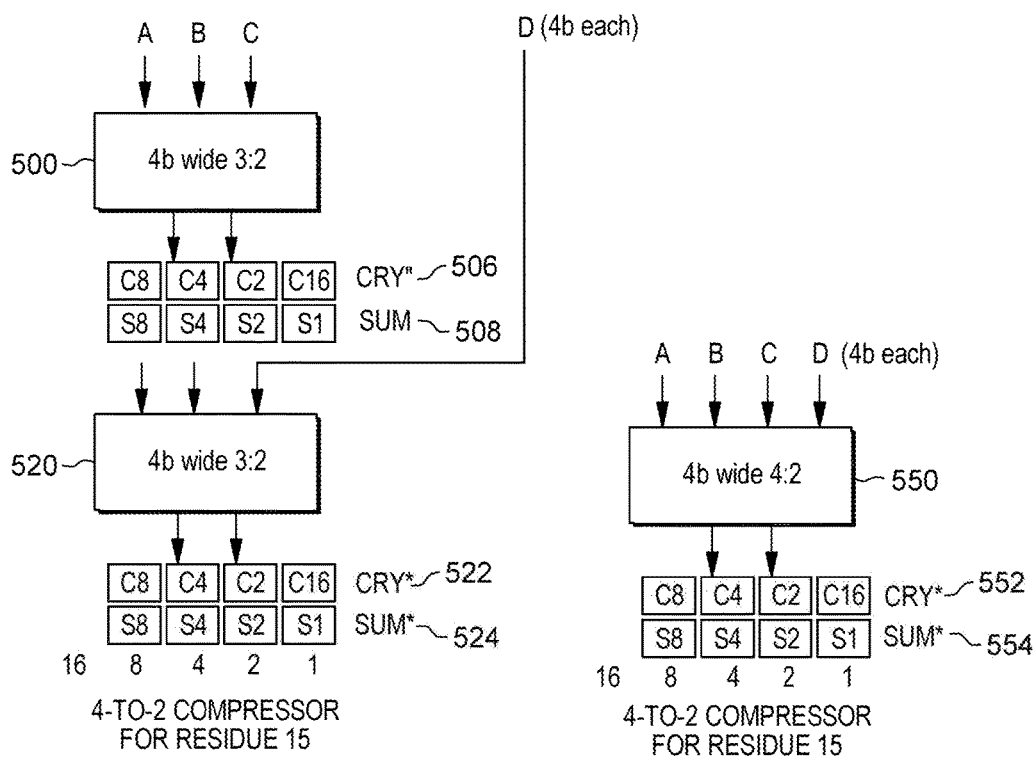
4-TO-2 COMPRESSOR
FOR RESIDUE 15
FIG. 5B
4-TO-2 COMPRESSOR
FOR RESIDUE 15
FIG. 5C

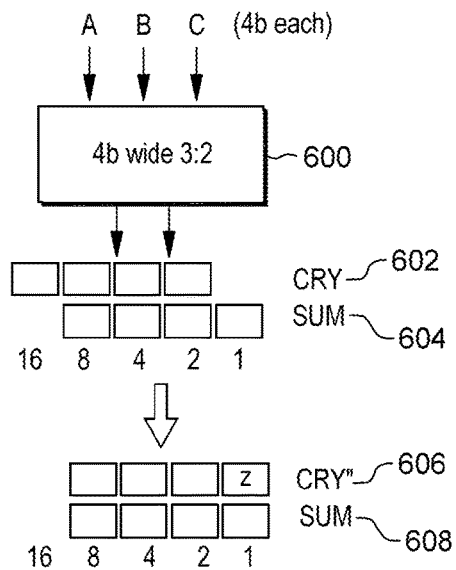
FIG.6A
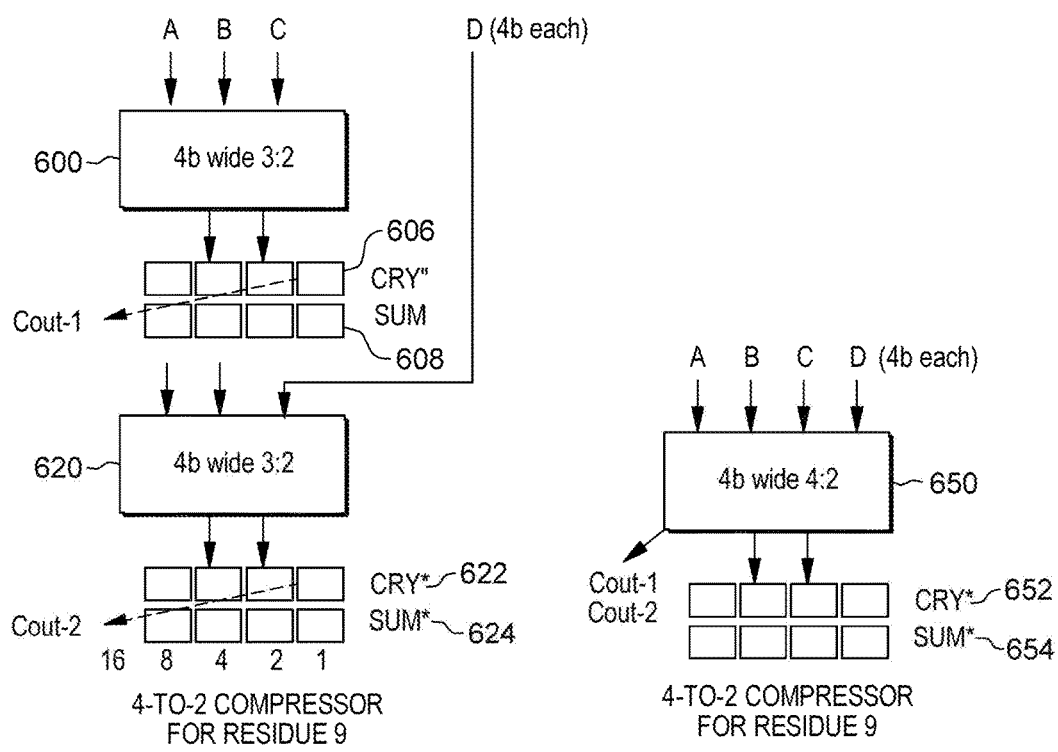
4-TO-2 COMPRESSOR
FOR RESIDUE 9
FIG. 6B
4-TO-2 COMPRESSOR
FOR RESIDUE 9
FIG. 6C

EXTRACT Res9 OUT OF Res15-INTERMEDIATE VALUE — 702

| | Res15 (700) | res9_hi |
|---|---|---|
| 0 | 0000 0000 | 0 |
| 1 | 0000 0001 | 0 |
| 2 | 0000 0010 | 0 |
| 3 | 0000 0011 | 3 |
| 4 | 0000 0100 | 3 |
| 5 | 0000 0101 | 3 |
| 6 | 0000 0110 | 6 |
| 7 | 0000 0111 | 6 |
| 8 | 0000 1000 | 6 |
| 9 | 0000 1001 | 0 |
| 10 | 0000 1010 | 0 |
| 11 | 0000 1011 | 3 |
| 12 | 0000 1100 | 3 |
| 13 | 0000 1101 | 3 |
| 14 | 0000 1110 | 6 |
| 15 | 0000 1111 | 6 |

FIG. 7A

COUNT 4 BITS (CARRIES) MODULO 3

| COUNT 4 BITS (750) | COUNT | MOD3 (752) |
|---|---|---|
| 0000 | 0 | 0 |
| 0001 | 1 | 1 |
| 0010 | 1 | 1 |
| 0011 | 2 | 2 |
| 0100 | 1 | 1 |
| 0101 | 2 | 2 |
| 0110 | 2 | 2 |
| 0111 | 3 | 0 |
| 1000 | 1 | 1 |
| 1001 | 2 | 2 |
| 1010 | 2 | 2 |
| 1011 | 3 | 0 |
| 1100 | 2 | 2 |
| 1101 | 3 | 0 |
| 1110 | 3 | 0 |
| 1111 | 4 | 1 |

FIG. 7B

COMBINED RESIDUE CIRCUIT PROTECTING BINARY AND DECIMAL DATA

BACKGROUND

One or more aspects relate, in general, to protecting against errors in circuits, and in particular, to protecting binary and decimal arithmetic data and/or logic in such circuits.

Errors in circuits may occur from multiple sources, including particles hitting the circuit, circuits going bad during their end of life, variations in the physical design processes causing stuck-at faults, or design errors that went unnoticed into production.

One way to protect arithmetic logic, i.e., detect errors and possibly correct for such errors, is to model the arithmetic in modulo logic (i.e., residue logic), and then, compare the modulo result with the expected arithmetic result. For high protection, decimal arithmetic is checked with residue 9, whereas binary and hexadecimal arithmetic are checked with residue 15.

SUMMARY

Shortcomings of the prior art are overcome and additional advantages are provided through the provision of a circuit. The circuit includes, for instance, a combined residue circuit configured to receive data and to provide a first residue result and a second residue result, the first residue result is based on a first modulo value and the second residue result is based on a second modulo value, the first modulo value being different than the second modulo value, the first residue result to be used to protect data based on a first radix and the second residue result to be used to protect data based on a second radix different from the first radix.

Methods, systems and/or computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 5A depicts one example of further details relating to generating residue 15;

FIG. 5B depicts one example of a 4-to-2 compressor used to generate residue 15;

FIG. 5C depicts another example of a 4-to-2 compressor used to generate residue 15;

FIG. 6A depicts one example of further details relating to generating residue 9;

FIG. 6B depicts one example of a 4-to-2 compressor used to generate residue 9;

FIG. 6C depicts another example of a 4-to-2 compressor used to generate residue 9;

FIG. 7A depicts one example of a look-up table that may be used to extract a high portion of a residue 9 value from a residue 15 intermediate value, in accordance with an aspect of the present invention;

FIG. 7B shows one example of a table depicting a count of carries and corresponding modulo 3 values that may be used in accordance with an aspect of the present invention;

DETAILED DESCRIPTION

In accordance with an aspect of the present invention, a capability is provided to efficiently protect arithmetic data and/or logic, which computes decimal, as well as binary and hexadecimal functions. The protection includes using a combined residue circuit to detect errors in arithmetic functions, thus protecting the data. The arithmetic functions include decimal, binary and hexadecimal functions, as examples.

State of the art processors approach this protection in a number of ways. For example, the circuits do not mix binary and decimal arithmetic and use dedicated hardware for each class. This is a very expensive solution since arithmetic hardware is duplicated. Also, it does not work for binary-decimal convert functions. As another example, the circuits support binary and decimal arithmetic, but the logic is only protected by residue 3. This provides significantly worse error protection (e.g., 66% vs. 90%). As yet a further example, the function is modeled in separate residue 15 and residue 9 hardware, using too much hardware. Thus, in accordance with an aspect of the present invention, a combined residue circuit is provided that may be used to protect binary, decimal and hexadecimal arithmetic and data.

Figure 1:
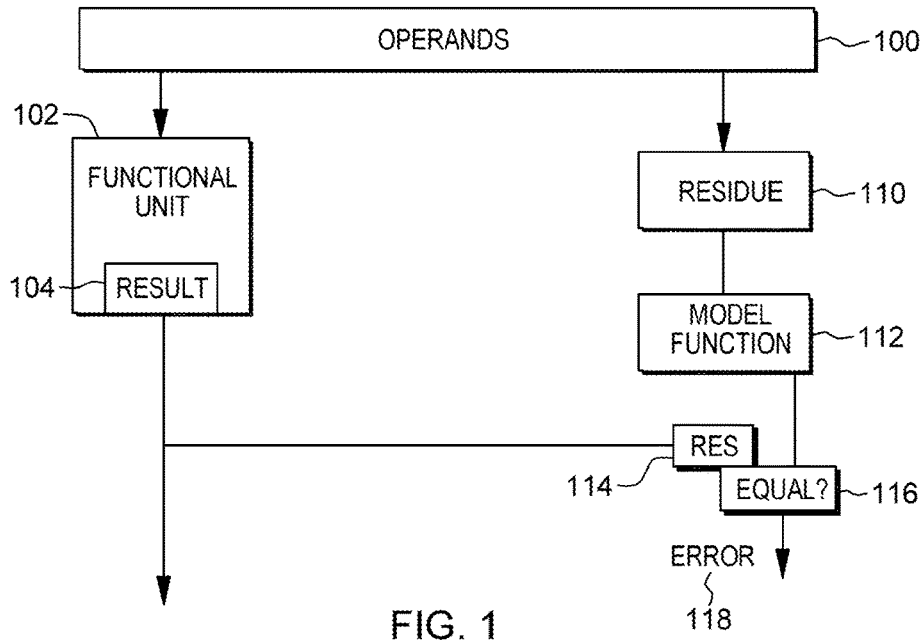
FIG. 1 depicts one example of using a residue block to check arithmetic results of a functional unit.

Further details relating to residue (also referred to herein as modulo) circuits are described with reference to FIG. 1. As shown, operands 100 (e.g., binary values, decimal values, hexadecimal values, etc.) of an arithmetic function are input to a functional unit 102 to perform the arithmetic function and obtain a result 104. The residue of the result (res 114) is computed. For instance, if the result is 10 and residue 9 is used, then the residue of the result is 1 (i.e., 10/9 has a remainder of 1, which is the residue).

Additionally, operands 100 are input to a residue circuit 110 to compute the residue of the operands. Further, the arithmetic function is modeled 112 in modulo logic. That is, the modeled arithmetic function is performed using the residue of the operands to obtain a result. That result is compared to res 114. If the comparison 116 provides a mismatch, then there is an error 118. For convenience herein, circuits or logic 110, 112 and 116 are collectively referred to as a residue block.

The residue circuit used depends on the desired level of protection and the type of function (e.g., binary, decimal, etc.) being performed. Example residue values and usages are indicated below:

| Residue | Coverage    | Usage                                 |
|---------|-------------|---------------------------------------|
| 3       | 2/3 = 66%   | binary, decimal, binary-decimal converts |
| 15      | 14/15 = 93% | binary, hex                           |
| 9       | 8/9 = 89%   | decimal                               |

As indicated above, residue 3 may be used for binary, decimal, and binary-decimal converts and provides a protection level of 66%; while residue 15 may be used for binary and hexadecimal and provides a protection level of 93%. Additionally, residue 9 may be used for decimal and provides a protection level of 89%.

Figure 2:
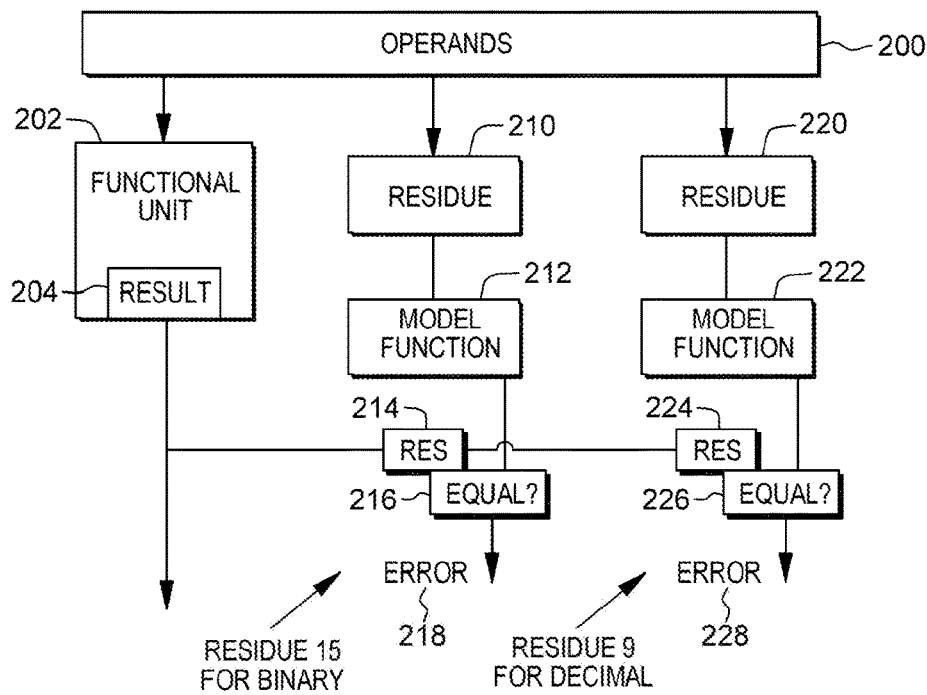
FIG. 2 depicts one example of using one residue block to check binary data and another residue block to check decimal data.

Today, to support both binary and decimal data and/or functions at a high level, separate residue blocks: residue 15 for binary data and residue 9 for decimal data, are employed, as depicted in FIG. 2.

As shown in FIG. 2, operands 200 of an arithmetic function are input to a functional unit 202 to perform the arithmetic function and obtain a result 204. The residue of that result is computed for both residue 15 (res 214) and residue 9 (res 224). Additionally, operands 200 are input to a residue 15 circuit 210 to compute the residue of the operands. Further, the arithmetic function is modeled 212 in modulo logic (mod 15), in which the modeled arithmetic function is performed using the residue of the operands to obtain a result. That result is compared to res 214. If the comparison 216 provides a mismatch, then there is an error 218. Similar to the above, for convenience, circuits or logic 210, 212, and 216 are collectively referred to as a residue 15 block.

Further, operands 200 are also input to a residue 9 circuit 220 to compute the residue of the operands. Further, the arithmetic function is modeled 222 in modulo logic (mod 9), in which the modeled arithmetic function is performed using the residue of the operands to obtain a result. That result is compared to res 224. If the comparison 226 provides a mismatch, then there is an error 228. Again, for convenience, circuits or logic 220, 222, and 226 are collectively referred to as a residue 9 block.

Based on detecting an error, an indication of the error may be provided and/or corrective action may be taken. Many possibilities exist. The protection of the arithmetic functions/data is rooted in and inextricably tied to computer technology, improving computer processing, security and/or performance.

Although the separate residue blocks for residue 15 and residue 9 described above provide good coverage, more hardware is used than desired. Thus, in accordance with an aspect of the present invention, instead of providing both residue 15 and residue 9 blocks, a residue 15 block is provided that supports residue 9 for decimal arithmetic. This combined residue block provides good protection at a much lower cost in hardware than separate blocks that separately support binary and hexadecimal, and decimal arithmetic and data.

Figure 3:
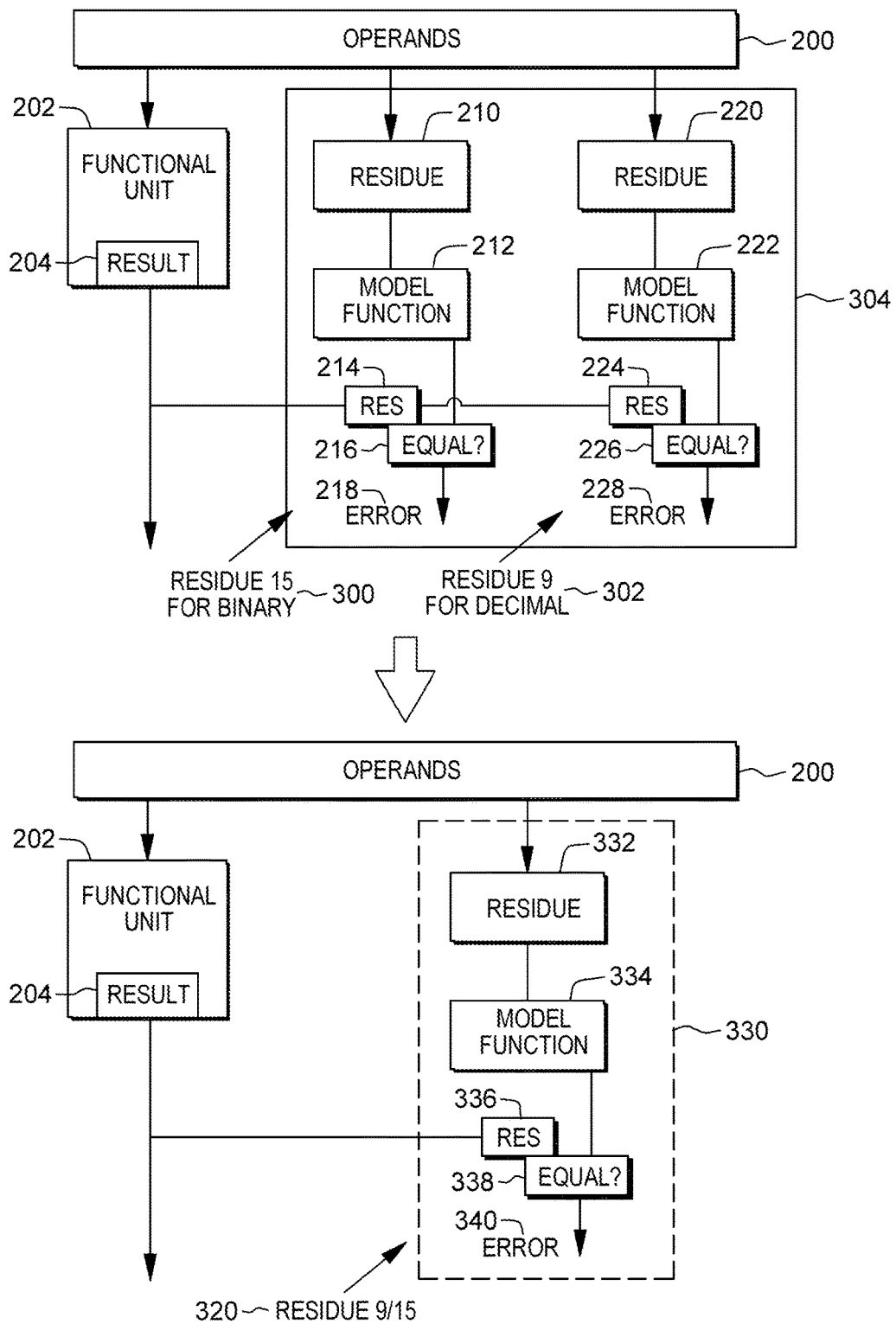
FIG. 3 depicts one example of a combined residue block to check binary data and decimal data, in accordance with an aspect of the present invention.

In accordance with an aspect of the present invention, a residue 15 block, which is used to protect, e.g., binary/hexadecimal arithmetic/data, is combined, with a residue 9 block, which is used to protect, e.g., decimal arithmetic/data. This combined residue block protects arithmetic circuits which support both binary (and hexadecimal) and decimal arithmetic. This is further described with reference to FIG. 3.

As depicted, the two residue blocks: residue 15 for binary (and/or hexadecimal) (300) and residue 9 for decimal (302), shown in box 304, are combined into a single residue block 320, shown in dashed box 330. This combined residue block 320 is able to handle binary (and/or hexadecimal) and decimal functional data, and to generate residue 15 and residue 9. It includes, for instance, residue circuit 332 used to compute the residue of operands 200 and a model function circuit 334 to model the arithmetic function in modulo logic. The result of the modeled arithmetic function is compared to res 336 (which is the residue of result 204 in either mod 9 or mod 15 depending on the type of function). If there is a mismatch 338, an error 340 is indicated.

Figure 4:
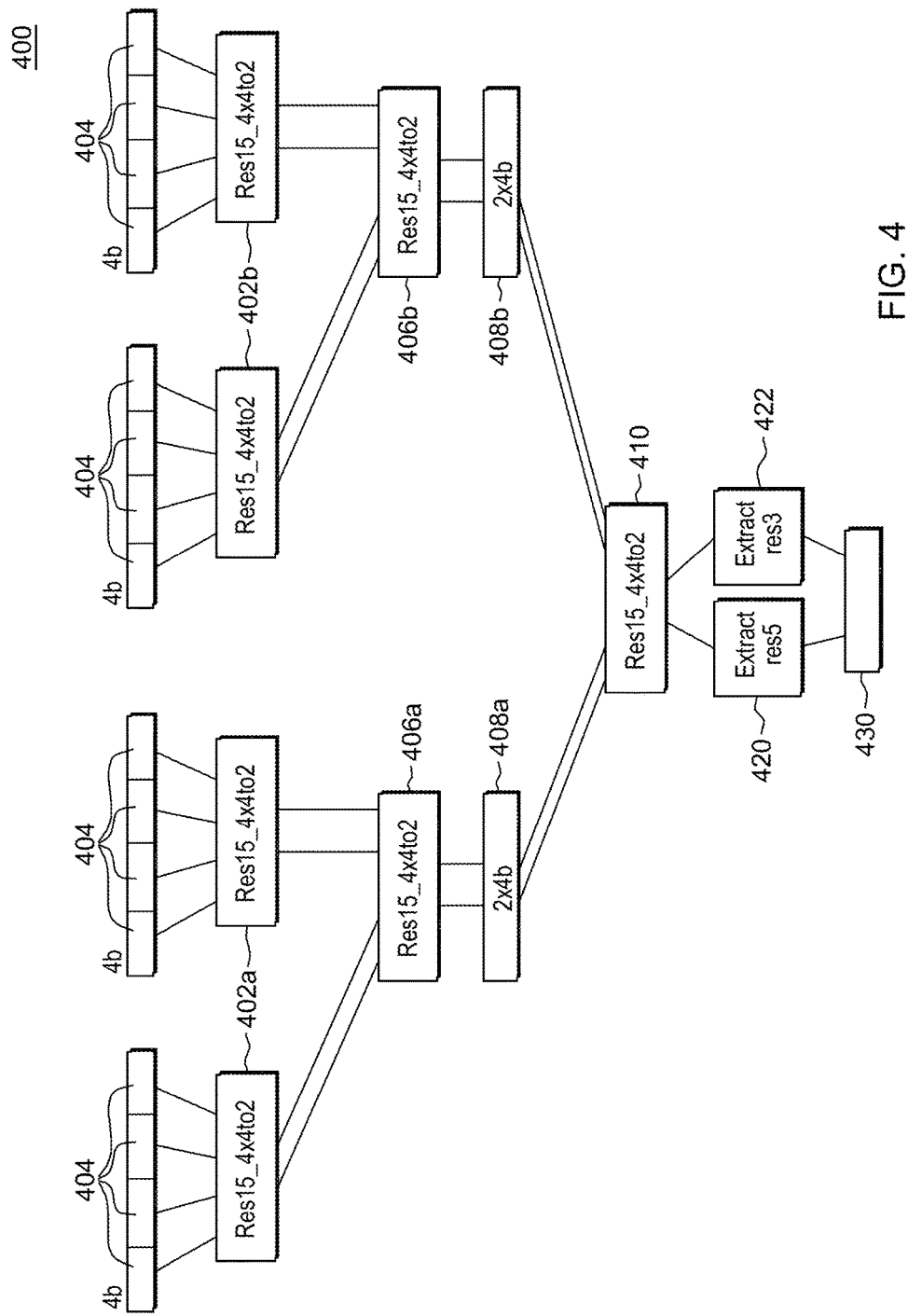
FIG. 4 depicts one example of a circuit to generate residue 15.
Figure 8:
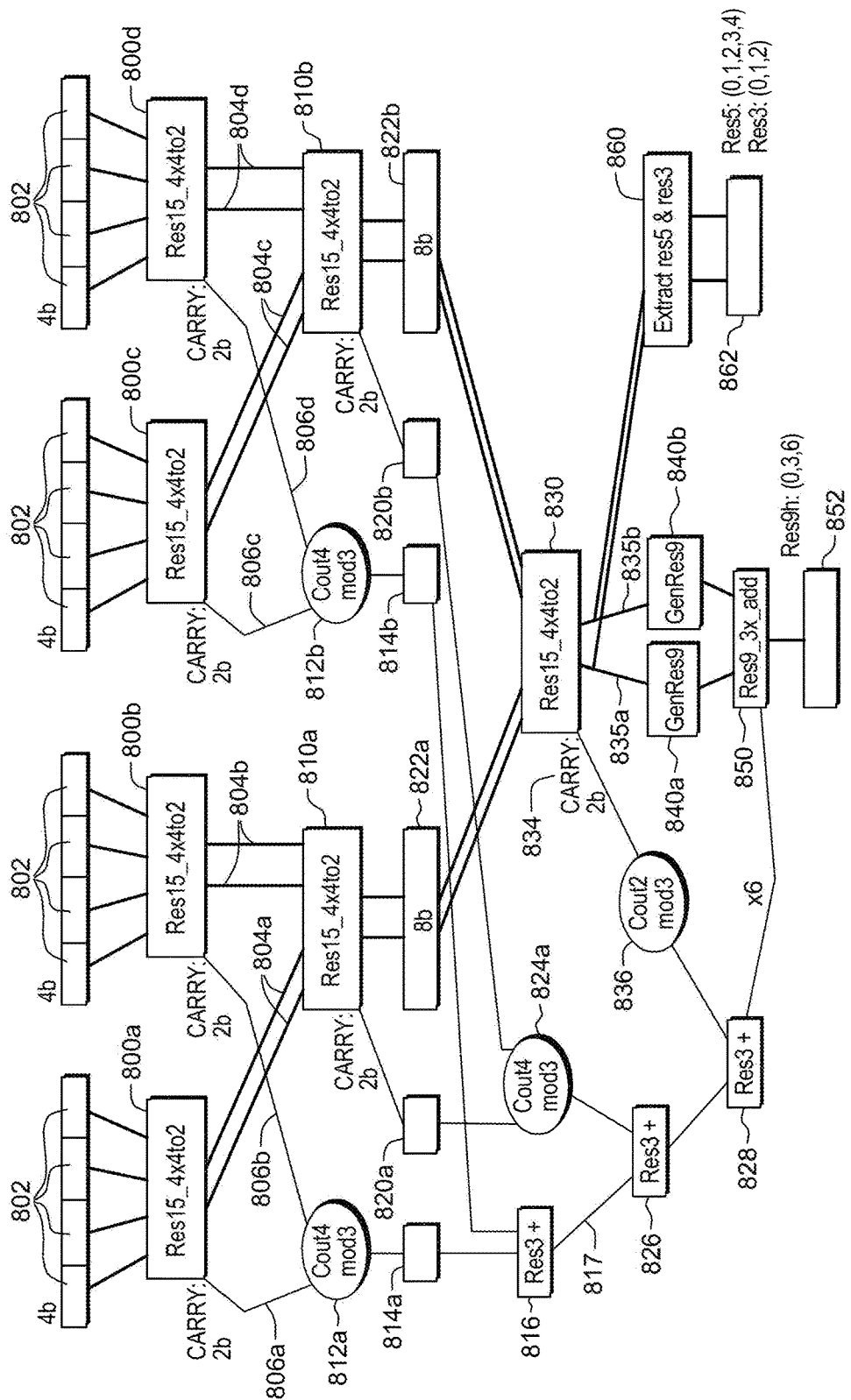
FIG. 8 depicts one example of a combined residue circuit, in accordance with an aspect of the present invention.

Further details regarding how a combined residue block generates multiple residue results are described with reference to FIGS. 4-8. In particular, FIGS. 4-5C are used to describe generation of a res 15 result; FIGS. 6A-6C are used to describe generation of a res 9 result; FIGS. 7A-7B depict reference tables used as described herein; and FIG. 8 depicts circuitry for a combined residue 9/15 circuit.

Referring initially to FIG. 4, the generation of a residue 15 result is described. A residue 15 circuit 400 includes, for instance, a plurality of (e.g., 4) Res15 4-to-2 circuits 402a, 402b each receiving as input a plurality of (e.g., 4) data units 404, each of a specified length (e.g., 4 bits). Each circuit 402a, 402b is, for instance, a 4 bit carry save adder, where carry outs are fed back into position 0. (In another example, selectors/multiplexors may be used in place of the carry save adders.) Each circuit 402a compresses its input of e.g., four 4 bit values (e.g., 32 bits) to provide an output of, e.g., two 4 bit values (e.g., 8 bits). The outputs of circuits 402a are input to another Res15 4-to-2 circuit 406a, which provides an output 408a of, e.g., two 4 bit values. Similarly, each circuit 402b compresses its input to provide an output, which is input to Res15 4-to-2 circuit 406b, which provides an output 408b. Each output 408a, 408b is input to another Res15 4-to-2 circuit 410. The output of circuit 410 is input to an extract res5 circuit 420 and an extract res3 circuit 422. The output of circuits 420 (a res 5 value) and 422 (a res 3 value) are combined (e.g., added) to provide a residue 15 result 430.

Further details regarding a Res15 4-to-2 circuit are described with reference to FIGS. 5A-5C. In one example, to generate residue 15, a 3-to-2 (3:2) circuit is first used, as shown in FIG. 5A, and then the output of that circuit is fed into another 3-to-2 circuit, as depicted in FIG. 5B.

Initially, as shown in FIG. 5A, a 3-to-2 circuit 500 receives a plurality of (e.g., 3) inputs (A B C), each, e.g., 4 bits wide; and the output is a carry (CRY) vector 502 and a sum (SUM) vector 504. In one example, circuit 500 performs, as follows:

$$A+B+C=2*CRY+SUM$$

For Arithmetic Modulo 15:

$$X*16 \equiv X+15*X \equiv X, \text{ where} \equiv \text{ indicates is identical to}$$

$$A+B+C \equiv 2*CRY+SUM \equiv SUM+CRY^{\parallel}$$

Therefore, as an example, a binary number can be divided into four bit groups and each four bit group of a binary number can have its residue 15 evaluated independent of the other four bit group of the binary number. Thus: feeding back the carry out of the 3:2 (or 4:2) circuit from position (*16) into position (*1) to obtain carry vector (CRY∥) 506 and sum vector (SUM) 508. For example, the 8-bit binary number A(0:7):

$$A(0:7)=A(0:3)*16+A(5:7)$$

Therefore: res15(A(0:7))=res15(A(0:3))+res15(A(5:7)) allows to first add 4-bit groups modulo 15 using CSA (carry save adders), and in the final step derive a true res 15 code.

Subsequent to using circuit 500 to obtain carry vector (CRY∥) 506 and sum vector (SUM) 508, those outputs of circuit 500 are input to another 3-to-2 circuit 520, as shown in FIG. 5B. For example, CRY∥ vector 506 and SUM vector 508 are input to circuit 520 (e.g., a 4b wide 3:2 compressor), as well as another input D (e.g., a 4 bit wide value). Compression is performed on these inputs, as described above, producing an output of a CRY* vector 522 and a SUM* vector 524. The use of circuits 500 and 520 provide a 4-to-2 compressor for residue 15.

In a further embodiment, another 4-to-2 circuit may be used as depicted in FIG. 5C. As shown in FIG. 5C, a circuit 550 is a 4-to-2 compressor that receives four inputs (A B C D) and produces a carry vector (CRY*) 552 and a SUM* vector 554.

In addition to the description of residue 15 generation, further details regarding generation of residue 9, and in particular, the handling of decimal data, are described with reference to FIGS. 6A-6C. Residue 9 is used for, e.g., decimal data in a binary coded decimal (BCD) format. That is, the 4 bit input is used to code a decimal digit (0 . . . 9). The decimal arithmetic is still performed on binary hardware, and therefore, the carry out of a 4b group is to be corrected. In binary arithmetic, it accounts for 16, but in decimal arithmetic, it accounts for 10. Thus, a 6-correction in the arithmetic, as well as in the residue logic is performed, as described below.

Referring to FIG. 6A, in one example, to generate residue 9, a 3-to-2 circuit 600 is used that receives a plurality of (e.g., 3) inputs (A B C), each, e.g., 4 bits wide; and the output is a carry (CRY) vector 602 and a sum (SUM) vector 604. In one example, circuit 600 performs, as follows:

$$A(0:7)=A(0:3)*10+A(4:7)$$

Residue checking/modulo arithmetic is based on mod 9:

$$Res9\ (A(0:7)) = res9(A(0:3)*10) + res9(A(4:7)) =$$
$$res9(A(0:3)*(1+9)) + res9(A(4:7)) = res9(A(0:3)) + res9(A(4:7))$$

Using Modulo CSA (carry save adder) block— mod 9

$$X*16 \equiv 9*X + 6*X \equiv X + 6X$$

$$A+B+C=2*CRY+SUM \equiv SUM+CRY\|+6z$$

feeding back the carry out of the 3:2 (or 4:2) circuit from position (16) into position (*1)
+6—correction for the carry term "z"
Carries can be counted modulo 3:

$$6*(c0+c1+c2\ldots)=6*(3*z+v)=18*z+6*v \equiv 6*v, \text{ where}$$
$v$ is the data value.

Note that a 4:2 circuit with feedback has 2 carry out signals, in one example.

Subsequent to using circuit 600 to obtain carry vector (CRY∥) 606 and sum vector (SUM) 608, those outputs are input to another 3-to-2 circuit 620, as shown in FIG. 6B. For example, CRY∥ vector 606 and sum vector 608 are input to circuit 620 (e.g., a 4b wide 3:2 compressor), as well as another input D (e.g., a 4 bit wide value). Compression is performed on these inputs, as described above, producing an output of a CRY* vector 622 and a SUM* vector 624. Further, 2 carry outs are produced. The use of circuits 600 and 620 provide a 4-to-2 compressor for residue 9.

In a further embodiment, another 4-to-2 circuit may be used as depicted in FIG. 6C. As shown in FIG. 6C, a circuit 650 is a 4-to-2 compressor that receives four inputs (A B C D) and produces a carry vector (CRY*) 652 and a SUM* vector 654, with two carry outs.

In accordance with an aspect of the present invention, the residue 15 logic and the residue 9 logic are combined into a combined residue 9/15 circuit. In particular, in one example, a residue 15 circuit is enhanced for residue 9, as described below. The combined circuit includes a plurality of Res 15 compressor circuits, a plurality of carry out mod 3 circuits, and a plurality of generate (gen) res 9 circuits, as well as additional circuits to produce a residue 9 value, as well as a residue 15 value. As described further below, the generate res 9 circuits extract res 9 out of a res 15 intermediate value. A look-up table showing such resulting values is depicted in FIG. 7A. As shown, from the 16 possible input values 700 input into a gen res 9 circuit, a res 9 high value 702 is obtained. In one example, a residue 9 value includes a residue 3 value and a residue 9 high part. The values, 0, 1, 2, 3, 4, 5, 6, 7, 8 can be represented by a tuple {0, 1, 2}+{0, 3, 6} by adding the two tuple elements: e.g., 4=(1, 3).

Additionally, each carry out mod 3 circuit counts the number of carries and provides a mod 3 result. Example counts and mod 3 values are depicted in FIG. 7B. For each count 750, the resulting mod 3 result 752 is provided.

Further details relating to a combined res 9/15 circuit are described with reference to FIG. 8. In one example, each Res15 4-to-2 circuit 800a-800d receives a plurality of inputs 802 (e.g., 4), each of a specified size (e.g., 4 bits). The output of circuit 800a includes, e.g., two 4 bit values 804a and a carry value 806a (e.g., 2 bits). Similarly, circuit 800b provides two outputs 804b and a carry value 806b; circuit 800c provides two outputs 804c and a carry value 806c; and circuit 800d provides two outputs 804d and a carry value 806d.

Outputs 804a and 804b are input to another circuit 810a (e.g., a Res15 4-to-2 circuit), and outputs 804c and 804d are input to a circuit 810b (e.g., a Res15 4-to-2 circuit). Further, carry bits 806a, 806b are input to a carry out circuit 812a, which performs modulo 3 arithmetic. Similarly, carry bits 806c, 806d are input to carry out circuit 812b.

Each carry out circuit 812a, 812b counts the input carries to obtain a count, performs mod 3 arithmetic on the count, and produces a value (e.g., 0, 1 or 2)—see FIG. 7B. Thus, the output of circuit 812a is a value 814a (e.g., 4 bits), and the output of circuit 812b is a value 814b (e.g., 4 bits). Outputs 814a, 814b are input to a modulo 3 circuit 816, which adds the two inputs together, performs mod 3 arithmetic and provides an output 817.

Circuit 810a performs compression, as described above, and produces a carry value 820a and two 4 bit values 822a. Similarly, circuit 810b performs compression and provides a carry value 820b and two 4 bit values 822b. Carry values 820a, 820b are input to a carry out circuit 824a. Circuit 824a counts the carries, performs mod 3 arithmetic on the count and provides an output, which is input to a modulo 3 circuit 826, along with output 817. Circuit 826 adds the values, performs modulo 3 arithmetic on the added values and provides an output. The output of circuit 826 is input to another module 3 circuit 828.

Further, outputs 822*a*, 822*b* are input to a further circuit 830 (e.g., Res15 4-to-2), which performs compression, and outputs a carry value 834, and two 4 bit values 835*a*, 835*b*. Carry value 834 is input to a carry out circuit 836 (e.g., carry out 2 mod 3), which counts the carries, performs mod 3 and outputs a value, which is input to circuit 828. Circuit 828 adds its inputs, performs mod 3 and provides an output. The output of circuit 828 is a value, which is multiplied by 6 (as a correction) to produce a value, which is input to a circuit 850 (e.g., a Res9_3x_add).

Additionally, output 835*a* is input to a circuit 840*a*, and output 835*b* is input to a circuit 840*b*. Each circuit 840*a*, 840*b* generates a res 9 value, as described above. Those values are input to circuit 850, which adds the 3 input values, performs res 9 arithmetic, and obtains the high value of the res 9 output, Res9h: (0,3,6) 852.

Further, outputs 835*a*, 835*b* are input to circuit 860, which performs an extract res5 and res3, the output of which provides a mod 15 result 862 (res5: 0, 1, 2, 3, 4), res3: (1, 1, 2)).

As described herein, a combined residue 9/15 circuit is provided that is used to protect both decimal and binary data, as well as hexadecimal data. Such a circuit may be used in many environments, including, but not limited to, computing systems that perform arithmetic functions. One such system is depicted in FIG. 9.

Figure 9:
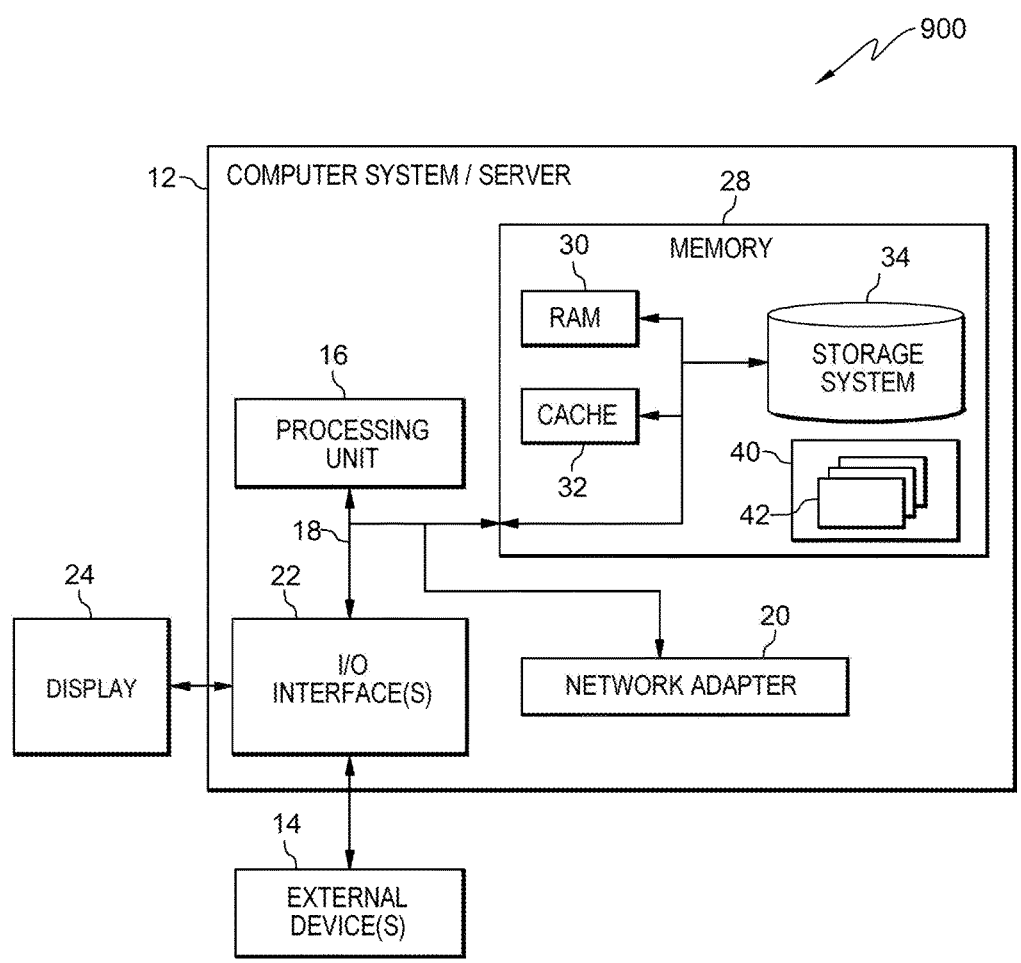
FIG. 9 depicts one example of a computer system that may incorporate and use the combined residue circuit of FIG. 8, in accordance with an aspect of the present invention.

Referring to FIG. 9, a computing environment 900 includes, for instance, a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the examples above, a combined residue 9/15 circuit is provided to protect data/functions based on, e.g., radix 10 (decimal) and radix 2 (binary). However, this is only one example. This circuit may be used or adapted to protect data based on other radices (e.g., 16 for hexadecimal and/or others). Further, other combined residue circuits may be provided to protect data and/or functions of other radices, and/or to combine different residues. Many possibilities exist.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other combination circuits may be provided to protect decimal and binary data, and/or other types of data. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A circuit comprising:
   a combined residue circuit configured to receive data and to provide a first residue result and a second residue result, the first residue result being based on a first modulo value and the second residue result being based on a second modulo value, the first modulo value being different than the second modulo value, the first residue result to be used to protect data based on a first radix and the second residue result to be used to protect data based on a second radix different from the first radix, wherein the combined residue circuit comprises:
   a first set of first circuits configured to provide a first set of carries and a first set of values;
   a second set of second circuits configured to provide a second set of carries and a second set of values;
   a first carry out circuit configured to receive the first set of carries and provide a first count value;
   a second carry out circuit configured to receive the second set of carries and provide a second count value;
   a first modulo circuit configured to receive the first count value and the second count value and provide a third count value;
   a third circuit configured to receive the first set of values and provide a third carry and a third value;
   a fourth circuit configured to receive the second set of values and provide a fourth carry and a fourth value;
   a third carry out circuit configured to receive the third carry and the fourth carry and provide a fourth count value;
   a second modulo circuit configured to receive the third count value and the fourth count value and provide a fifth count value;
   a fifth circuit configured to receive the third value and the fourth value and provide a fifth carry, a fifth value and a sixth value;
   a fourth carry out circuit configured to receive the fifth carry and provide a sixth count value;
   a third modulo circuit configured to receive the :fifth count value and the sixth count value and provide a seventh count value;
   a first generate circuit configured to receive the fifth value and provide a first output;
   a second generate circuit configured to receive the sixth value and provide a second output;
   a fourth modulo circuit configured to receive the first output, the second output, and the seventh count value with a correction applied thereto and to provide at least part of the first residue result; and
   at least one extract circuit configured to receive the fifth value and the sixth value and to provide extracted residues to be used to provide at least the second residue result.

2. The circuit of claim 1, wherein the first modulo value and the second modulo value are greater than three.

3. The circuit of claim 1, wherein the first modulo value is nine and the second modulo value is fifteen.

4. The circuit of claim 1, wherein the first radix is ten for decimal data and the second radix is two for binary data or sixteen for hexadecimal data.

5. The circuit of claim 1, wherein the combined residue circuit is configured to receive decimal and binary data, the first modulo value is nine, and wherein based on receiving decimal data, the first residue result based on modulo nine is used to protect the decimal data.

6. The circuit of claim 5, wherein the second modulo value is fifteen and based on receiving binary data, the second residue result based on modulo fifteen is used to protect the binary data.

7. The circuit of claim 1, wherein the combined residue circuit is configured to count carries output from a plurality of compressors to obtain a count, obtain a carry result based on the count, apply a correction to the carry result, and use the correction to obtain the first residue result.

8. The circuit of claim 7, wherein the combined residue circuit is further configured to perform a modulo operation on the count prior to using the count to obtain the carry result.

9. The circuit of claim 8, wherein the modulo operation is modulo three.

10. The circuit of claim 1, wherein the combined residue circuit comprises a plurality of carry-save adders configured to provide output to be used to provide the first residue result and the second residue result.

11. The circuit of claim 1, wherein the extracted residues include one residue value to be used to provide the first residue result.

12. A computer system comprising:
a memory; and
a processor in communication with the memory, the processor comprising a combined residue circuit configured to receive data and to provide a first residue result and a second residue result, the first residue result being based on a first modulo value and the second residue result being based on a second modulo value, the first modulo value being different than the second modulo value, the first residue result to be used to protect data based on a first radix and the second residue result to be used to protect data based on a second radix different from the first radix, wherein the combined residue circuit comprises:
a first set of first circuits configured to provide a first set of carries and a first set of values;
a second set of second circuits configured to provide a second set of carries and a second set of values;
a first carry out circuit configured to receive the first set of carries and provide a first count value;
a second carry out circuit configured to receive the second set of carries and provide a second count value;
a first modulo circuit configured to receive the first count value and the second count value and provide a third count value;
a third circuit configured to receive the first set of values and provide a third carry and a third value;
a fourth circuit configured to receive the second set of values and provide a fourth carry and a fourth value;
a third carry out circuit configured to receive the third carry and the fourth carry and provide a fourth count value;
a second modulo circuit configured to receive the third count value and the fourth count value and provide a fifth count value;
a fifth circuit configured to receive the third value and the fourth value and provide a fifth carry, a fifth value and a sixth value;
a fourth carry out circuit configured to receive the fifth carry and provide a sixth count value;
a third modulo circuit configured to receive the fifth count value and the sixth count value and provide a seventh count value;
a first generate circuit configured to receive the fifth value and provide a first output;
a second generate circuit configured to receive the sixth value and provide a second output;
a fourth modulo circuit configured to receive the first output, the second output, and the seventh count value with a correction applied thereto and to provide at least part of the first residue result; and
at least one extract circuit configured to receive the fifth value and the sixth value and to provide extracted residues to be used to provide at least the second residue result.

13. The computer system of claim 12, wherein the first modulo value is nine and the second modulo value is fifteen, and wherein the first radix is ten for decimal data and the second radix is two for binary data or sixteen for hexadecimal data.

14. The computer system of claim 12, wherein the combined residue circuit is configured to receive decimal and binary data, the first modulo value is nine, and wherein based on receiving decimal data, the first residue result based on modulo nine is used to protect the decimal data.

15. The computer system of claim 14, wherein the second modulo value is fifteen and based on receiving binary data, the second residue result based on modulo fifteen is used to protect the binary data.

16. The computer system of claim 12, wherein the first modulo value and the second modulo value are greater than three.

17. A computer program product comprising:
a computer readable storage medium readable by a processing circuit and storing instructions for execution by the processing circuit for performing the following comprising:
using a combined residue circuit to protect data, the combined residue circuit configured to receive data and to provide a first residue result and a second residue result, the first residue result being based on a first modulo value and the second residue result being based on a second modulo value, the first modulo value being different than the second modulo value, the first residue result to be used to protect data based on a first radix and the second residue result to be used to protect data based on a second radix different from the first radix, wherein the combined residue circuit comprises:
a first set of first circuits configured to provide a first set of carries and a first set of values;
a second set of second circuits configured to provide a second set of carries and a second set of values;
a first carry out circuit configured to receive the first set of carries and provide a first count value;
a second carry out circuit configured to receive the second set of carries and provide a second count value;
a first modulo circuit configured to receive the first count value and the second count value and provide a third count value;

a third circuit configured to receive the first set of values and provide a third carry and a third value;
a fourth circuit configured to receive the second set of values and provide a fourth carry and a fourth value;
a third carry out circuit configured to receive the third carry and the fourth carry and provide a fourth count value;
a second modulo circuit configured to receive the third count value and the fourth count value and provide a fifth count value;
a fifth circuit configured to receive the third value and the fourth value and provide a fifth carry, a fifth value and a sixth value;
a fourth carry out circuit configured to receive the fifth carry and provide a sixth count value;
a third modulo circuit configured to receive the fifth count value and the sixth count value and provide a seventh count value;
a first generate circuit configured to receive the fifth value and provide a first output;
a second generate circuit configured to receive the sixth value and provide a second output;
a fourth modulo circuit configured to receive the first output, the second output, and the seventh count value with a correction applied thereto and to provide at least part of the first residue result; and
at least one extract circuit configured to receive the fifth value and the sixth value and to provide extracted residues to be used to provide at least the second residue result.

18. The computer program product of claim 17, wherein the first modulo value is nine and the second modulo value is fifteen, and wherein the first radix is ten for decimal data and the second radix is two for binary data or sixteen for hexadecimal data.

19. The computer program product of claim 17, wherein the combined residue circuit is configured to receive decimal and binary data, the first modulo value is nine, and wherein based on receiving decimal data, the first residue result based on modulo nine is used to protect the decimal data.

20. The computer program product of claim 19, wherein the second modulo value is fifteen and based on receiving binary data, the second residue result based on modulo fifteen is used to protect the binary data.

* * * * *